Sept. 14, 1965    M. E. ANDERSON ETAL    3,206,159
VACUUM-OPERATED VALVE
Original Filed Sept. 29, 1961
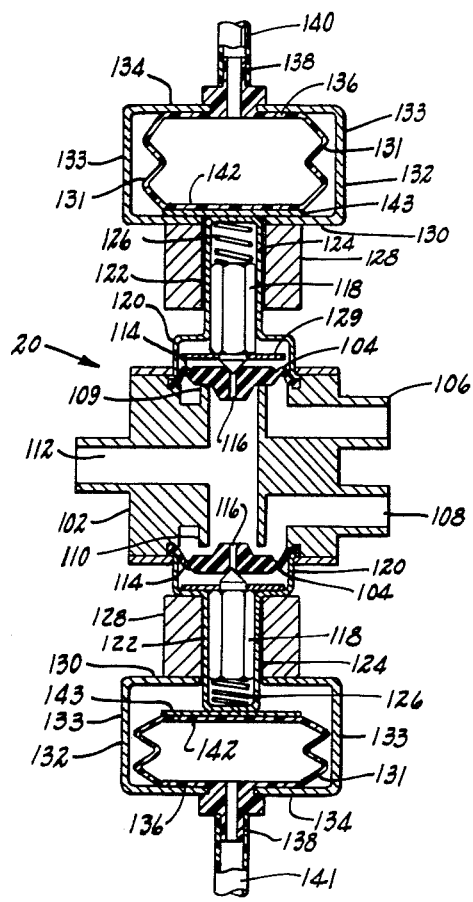
INVENTORS
MAYNARD E. ANDERSON
EMIL R. PLASKO
JOHN SOKOLY
MELVIN W. POLKINGHORN
BY
JOHN E. McRAE
ATTORNEY

United States Patent Office 3,206,159
Patented Sept. 14, 1965

3,206,159
VACUUM-OPERATED VALVE
Maynard E. Anderson, Birmingham, Emil R. Plasko, Walled Lake, John Sokoly, Detroit, and Melvin W. Polkinghorn, Livonia, Mich., assignors to American Radiator & Standard Sanitary Corporation, New York, N.Y., a corporation of Delaware
Original application Sept. 29, 1961, Ser. No. 141,811, now Patent No. 3,112,630, dated Dec. 3, 1963. Divided and this application Apr. 1, 1963, Ser. No. 269,623
1 Claim. (Cl. 251—28)

This is a division of our application Serial No. 141,811, filed September 29, 1961, now Patent No. 3,112,630 and entitled, "Washing Machine Control and Components Used Therein." The present invention relates to a vacuum-operated water valve which may be employed in the control system of the above-identified application.

One object of the present invention is to provide a novel low cost vacuum-controlled water valve.

It is a further object to provide a vacuum-controlled water valve which is not subject to air leakage and which requires no packing such as might fail in service.

An additional object is to provide a vacuum-controlled water valve which can be readily operated with commercially attainable vacuum forces and which will not stick in service.

Other objects of this invention will appear from the following description and appended claims, reference being had to the accompanying drawings forming a part of this specification wherein like reference characters designate corresponding parts in the several views.

In the drawings:

The single figure is a sectional view of a water mixing valve constituting one embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown in the drawing, the invention takes the form of a water mixing valve 20 which comprises a valve body 102 having two pilot-operated diaphragm valve elements 104 individually controlled in accordance with the position of an armature disc 129. The water valve may in parts of its construction be formed similar to the conventional solenoid-controlled water valve commonly employed in present day washing machines. This is true particularly as regards the formation of valve body 102 and the pilot valve diaphragm 104. The illustrated valve body includes a hot inlet 106, cold inlet 108, annular hot valve seat 109, annular cold valve seat 110, and outlet 112. The water discharged through outlet 112 could be hot, warm or cold, depending on whether the hot diaphragm alone was raised, both diaphragms were raised, or the cold diaphragm alone was raised.

Each diaphragm 104 is provided with a small inlet bleed opening 114 and a larger outlet bleed opening 116 so that when bleed opening 116 is closed by the end portion of plunger 118 a body of water is trapped within the cup-like section 120 of the cover 122 to thereby force diaphragm 104 against seat 109 or 110. When plunger 118 is moved away from seat 109 or 110 the fluid pressure within cup-like section 120 is relieved to allow the inlet pressure to move the diaphragm to the open position.

Each plunger 118 is slidably disposed within the tubular guide-forming section 124 of cover 122, and a compression spring 126 is disposed in the outer end of each tubular section to normally urge plunger 118 toward a position closing bleed opening 116. To move plunger 118 away from the respective bleed opening 116 there is provided an annular permanent magnet 128 which is suitably secured to wall portion 130 of a frame generally designated by numeral 132. Each frame includes two parallel walls 133 extending alongside bellows 131 and inturned arms 134 which are suitably connected to the end wall 136 of the bellows.

Each bellows is preferably formed of plastic material to the configuration shown in the upper portion of the figure; thus in the absence of an internal vacuum force the bellows will be in an expanded condition. Preferably each bellows is provided with an integrally formed tubular portion 138 for receiving the end portion of the vacuum hose line 140 or 141. In order to operatively dispose each bellows on a fixed part of the valve, end wall 142 thereof is suitably secured to the tubular section 124 of cover 122, as through the mechanism of a plate or disc 143.

In operation of the hot valve, when no vacuum exists in line 140 magnet 128 is disposed adjacent the outer end of guide section 124 as shown in the figure; in this condition spring 126 operates on plunger 118 to close opening 116 and thus maintain diaphragm 104 in the closed position. When a vacuum force is applied from a vacuum pump (not shown) onto line 140 the bellows for the hot valve element contracts so that end wall 136 thereof is drawn toward the fixed end wall 142. As a result the frame 132 and magnet 128 are drawn toward the armature-forming disc 129 carried on plunger 118; the plunger is also preferably formed of magnetically attractable material.

Movement of magnet 128 toward disc 129 positions it sufficiently close to the disc so that the disc is now located within the area of attraction of the magnet such that the disc and plunger 118 snap away from bleed opening 116 in diaphragm 104. The trapped fluid between the diaphragm and cover section 120 is thereby vented through bleed opening 116, and the inlet fluid pressure becomes effective to force the diaphragm away from seat 109. This action permits flow of hot water to outlet 112. The operation of the cold valve is similar to that of the hot valve just described.

If desired each member 129 could be the permanent magnet, and member 128 could be formed of magnetically attractable material. The terms "magnetic member" and "magnetic armature" are used in the claims to denote members formed of permanently magnetized material or merely magnetically permeable material.

It will be understood that each of the hot and cold valves is provided with a vacuum actuator line 140 or 141 and that the temperature of the water flowing through outlet 112 is determined by which one, or both of the vacuum lines have a vacuum force applied thereto. When both of the vacuum lines 140 are under vacuum the outlet temperature is warm, when only vacuum line 140 is under vacuum the temperature is hot, and when only vacuum line 141 is under vacuum the outlet temperature is cold. The application of vacuum may be controlled by a timer as shown at 28 in the above-mentioned patent application, Serial No. 141,811, now Patent No. 3,112,630.

It will be understood that the above description is merely illustrative of the principles of the invention, and that the scope thereof is more particularly pointed out in the appended claim.

What is claimed:

In combination, a valve body having an inlet, an outlet, and a valve seat therebetween; a diaphragm disposed on said valve body to open and close said seat; a cover structure having a cup-like portion disposed over said diaphragm and a tubular guide portion extending axially therefrom; said diaphragm having an opening therein communicating with the valve body inlet for admitting fluid into the cover structure; a magnetic armature disposed within said cover structure and including an elongated plunger disposed in the guide portion and a disc disposed in the cup-like portion; said diaphragm having a bleed opening therethrough in registry with a portion of the armature so that movement of the armature toward the valve body closes the bleed opening, and movement of the armature away from the diaphragm opens the bleed opening; an annular magnetic member surrounding the aforementioned tubular guide portion, and a compression spring arranged within the guide portion to bias the plunger toward the diaphragm; a bellows having two end walls, one of which is secured to the cover structure; a frame carried on the other end wall and extending around the bellows to a fixed connection with the magnetic member; and a vacuum line connected with said other end wall so that application of vacuum to the interior of the bellows causes said other end wall to move toward the valve body with consequent advancement of the magnetic member toward the cup-like portion of the cover structure.

References Cited by the Examiner

UNITED STATES PATENTS

| | | | |
|---|---|---|---|
| 1,171,695 | 2/16 | Brady | 251—61.1 |
| 2,942,837 | 6/60 | Bauerlein | 251—65 XR |

ISADOR WEIL, *Primary Examiner.*